United States Patent [19]

Naimpally

[11] Patent Number: 4,536,788
[45] Date of Patent: Aug. 20, 1985

[54] DEMODULATED CHROMINANCE SIGNAL FILTER USING IMPEDANCE MISMATCHED SECTIONS

[75] Inventor: Saiprasad V. Naimpally, Indianapolis, Ind.

[73] Assignee: RCA Corporation, Princeton, N.J.

[21] Appl. No.: 488,813

[22] Filed: Apr. 26, 1983

[51] Int. Cl.³ .............................................. H04N 9/535
[52] U.S. Cl. ..................................................... 358/38
[58] Field of Search ...................... 358/38, 37, 40, 166

[56] References Cited

U.S. PATENT DOCUMENTS

| | | |
|---|---|---|
| 2,816,952 | 12/1957 | Lockhart . |
| 2,831,919 | 4/1958 | Lockhart . |
| 2,908,752 | 10/1959 | Lockhart . |
| 3,852,523 | 12/1974 | Humphrey ............................. 358/38 |
| 4,371,891 | 2/1983 | Yost ...................................... 358/31 |

Primary Examiner—Richard Murray
Attorney, Agent, or Firm—P. J. Rasmussen; P. M. Emanuel; R. H. Kurdyla

[57] ABSTRACT

A filter network suitable for translating a signal such as a demodulated "I" chrominance component of a composite color television signal is disclosed. The filter network comprises first and second cascaded sections with mutually grossly mismatched terminating impedances, and are passively interconnected via a resistance of a value which substantially precludes interaction between the sections over a given range of frequencies within the passband of the signals being translated. Both sections are separately excited with signals to be translated. The first section provides wideband filtering and a large amount of delay relative to that provided by the second section. The second section provides signal amplitude peaking within a given portion of the frequency passband of the first section.

23 Claims, 4 Drawing Figures

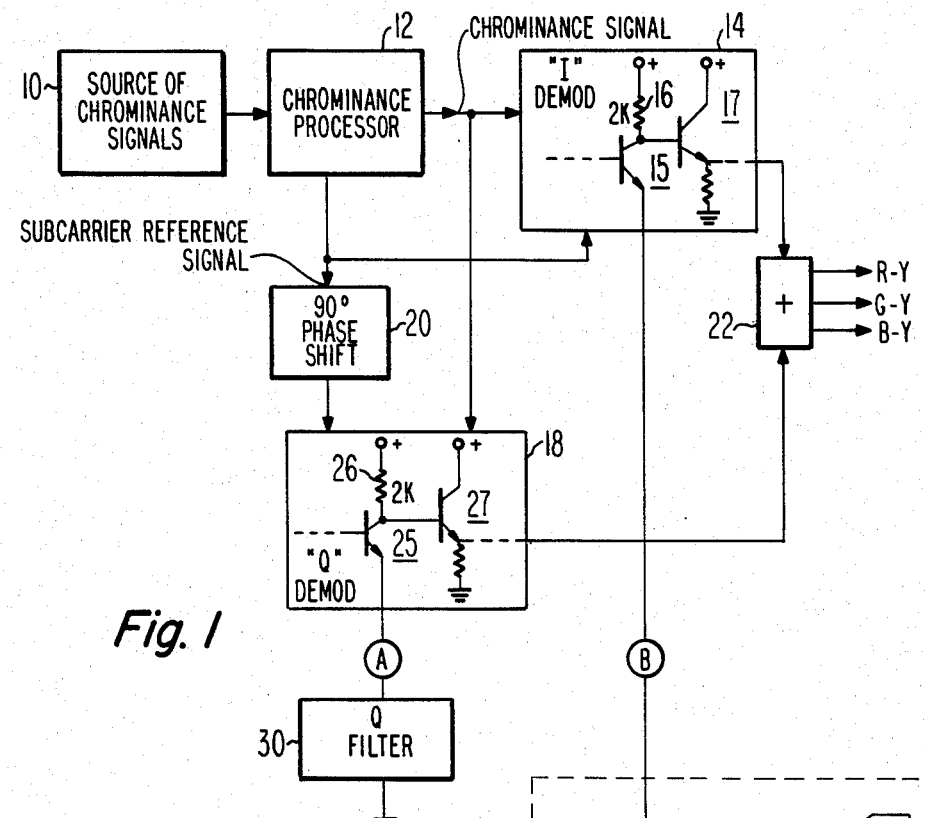
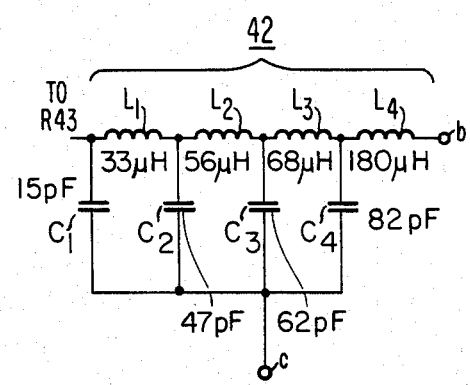
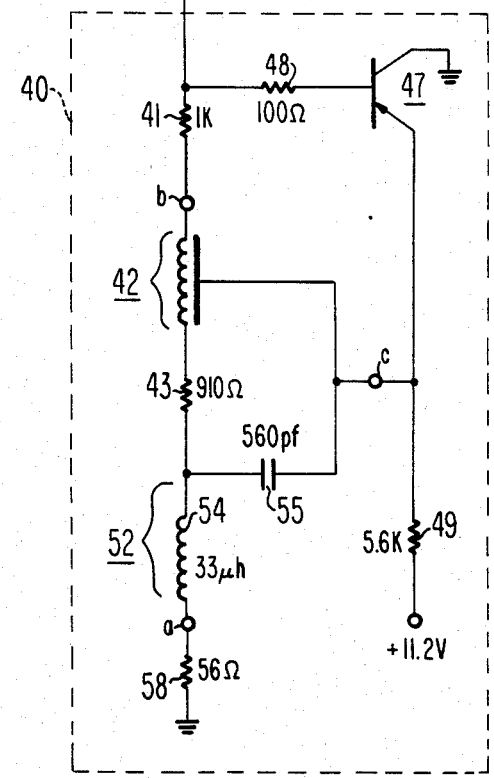
Fig. 1
Fig. 1a

DEMODULATED CHROMINANCE SIGNAL FILTER USING IMPEDANCE MISMATCHED SECTIONS

This invention concerns an electrical signal filter suitable for filtering a signal such as the demodulated "I" chrominance information signal component of a color television signal.

In accordance with the NTSC television signal broadcast standards adopted in the United States, the chrominance component of a composite broadcast color television signal is formed by encoding a pair of color difference signals as the modulation of a pair of chrominance subcarrier signals, where the subcarrier signals exhibit the same frequency but a mutually quadrature (90°) phase relationship. At the color television receiver, the pair of color difference signals must be separated or demodulated from the composite color signal. Thereafter, the separated color components are matrixed with the luminance component of the composite color television signal to form the drive signals for the kinescope of the television receiver.

One of the color difference signal components, commonly referred to as the "Q" signal, is transmitted as a double sideband narrow band signal of approximately 0–0.5 MHz bandwidth. The other color difference signal component, commonly referred to as the "I" signal, is transmitted as a relatively wide band signal of approximately 0–1.5 MHz bandwidth. In order to fit the encoded chrominance signal within the allocated 6 MHz video signal bandwidth, the upper sideband of the I signal is eliminated prior to transmission. The transmitted I signal contains double sideband information over a 0–0.5 MHz bandwidth and single sideband information over a 0.5–1.5 MHz bandwidth.

The method of transmitting the I signal using both single and double sideband information is an efficient way of utilizing the frequency spectrum allocated for broadcast television signals. However, the frequency spectrum energy associated with the single sideband information of the I signal is only one-half of what it would be if the I signal was fully double sidebanded. Therefore in the process of recovering the I signal at the receiver, it is necessary to compensate for the spectrum amplitude loss associated with the absence of one of the I signal sidebands. This can be accomplished by performing frequency selective signal peaking in the course of the I signal recovery process.

Circuits utilized to separate or demodulate the I and Q signals from the composite color signal can include I and Q synchronous demodulators, and associated I and Q signal filters. Delay compensation should be provided to assure that the filtered demodulated I and Q signals exhibit proper phase and timing synchronism when these signals are combined to develop plural red, green and blue color difference signals which are eventually matrixed with the luminance component of the composite color television signal to form the kinescope drive signals.

In accordance with the principles of the present invention, there is disclosed herein a filter network suitable for translating a signal such as a demodulated I chrominance component. The disclosed filter network comprises first and second frequency selective sections which are passively connected by means of a resistance having a value sufficient to substantially preclude interaction between the frequency selective sections over a given range of signal frequencies within the bandwidth of the signals being translated. The first and second sections are excited with signals to be translated, for imparting thereto an amplitude-versus-frequency response in accordance with the combined amplitude-versus-frequency responses of the first and second sections.

In accordance with a feature of the invention, the second section is directly excited with signals to be translated, at a point intermediate to the first and second sections.

In accordance with a further feature of the invention, the first and second sections comprise a high order, three-terminal filter coupled via a single interface terminal to a signal path conveying signals to be filtered. The filter furthermore provides a direct current bias path for the signal path.

In the drawing:

FIG. 1 shows a portion of a color television receiver including a color signal demodulator network and an associated filter network according to the present invention;

FIG. 1a shows additional circuit details of a portion of the filter network shown in FIG. 1.

Figure 2:
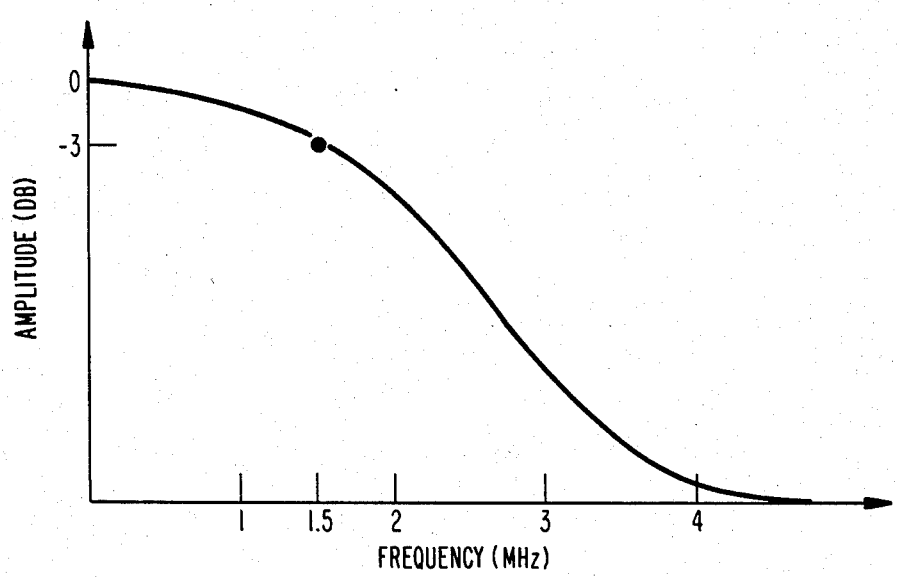
FIGS. 2 and 3 depict amplitude-versus-frequency characteristics helpful in understanding the operation of the filter network shown in FIG. 1.

In FIG. 1, chrominance information signals from a source 10 are applied to a chrominance signal processor 12, which includes chrominance gain control and phase control networks and various other signal processing circuits of a conventional nature, including a controlled local oscillator for regenerating a color subcarrier reference signal at a frequency of approximately 3.58 MHz. Processed chrominance information signals from processor 12 are applied to information signal inputs of an "I" phase chrominance signal demodulator 14, and to a "Q" phase chrominance signal demodulator 18. A regenerated 3.58 MHz chrominance subcarrier reference signal from processor 12 is applied to a reference signal input of demodulator 14, and a mutually quadrature phased subcarrier reference signal is applied to a reference signal input of demodulator 18 via a 90° phase shifting network 20. After appropriate filtering as will be discussed, demodulated I and Q chrominance signal components from the outputs of demodulators 14 and 18 are combined in a matrix amplifier 22 for developing output R-Y, G-Y and B-Y color difference signals. These signals are ultimately combined with the luminance component of the composite color television signal to produce red, green and blue color image representative signals for application to a color image display device.

The signal path within I demodulator 14 includes a phase detector (a synchronous demodulator) and an output circuit for receiving demodulated signals. The output circuit is shown as including a common emitter amplifier transistor 15 with an associated collector output load resistor 16, and an emitter follower transistor 17. Functionally corresponding transistors 25, 27 and a load resistor 26 are included in the signal path of Q demodulator 18 for receiving demodulated Q signals. The emitter electrodes of transistors 25 and 15 are respectively coupled via interfacing terminals A and B to Q and I signal filter networks 30 and 40. When I and Q demodulators 14 and 18 are constructed in an integrated circuit device, terminals A and B correspond to external connecting terminals of the integrated circuit device.

In a color television signal processing system according to NTSC broadcast standards such as employed in the United States, the Q signal modulation component of the chrominance signal from processor 12 occupies an approximately 0.5 MHz bandwidth on both upper and lower sidebands with respect to the 3.58 MHz frequency of the chrominance subcarrier signal. Thus in the modulated chrominance frequency spectrum the Q chrominance information to be demodulated includes signal frequencies from 3.08 MHz to 4.08 MHz. The quadrature phased I signal modulation component of the chrominance signal from processor 12 occupies an approximately 1.5 MHz bandwidth on a lower sideband relative to the chrominance subcarrier frequency, and occupies a 0.5 MHz bandwidth on an upper sideband relative to the chrominance subcarrier signal frequency. Thus in the modulated chrominance frequency spectrum the I chrominance information to be demodulated includes signal frequencies from 2.08 MHz to 4.08 MHz.

Filtering of the demodulated I and Q signals is respectively accomplished by filter networks 40 and 30 to provide appropriate I and Q signal information to the inputs of matrix 22, and to eliminate unwanted signal frequencies such as harmonics of the 3.58 MHz chrominance subcarrier signal. Q signal filter 30 can comprise, for example, a third order low pass filter with a 0-0.5 MHz amplitude vs. frequency response characteristic between the −3 db points. Filter 30 can be of the type shown in a copending U.S. patent application of W. E. Sepp, Ser. No. 470,618 filed Feb. 28, 1983, titled "High Order Electrical Signal Filters", incorporated herein by reference.

I signal filter network 40 according to the present invention comprises a high order filter including a first section 42 in cascade with a second section 52. The configuration of the filter including sections 42 and 52 is that of a filter having three terminals (a,b,c) and two signal ports (a,b) between which the filter transfer function is developed.

Filter section 42, which may be provided in encapsulated form, comprises a high order low pass filter with a 0-1.5 MHz amplitude vs. frequency response characteristic (transfer function) at the −3 db points. Low pass filter section 42 exhibits a −3 db point at 1.5 MHz, a −30 db point at approximately 3.58 MHz, and greater than 30 db attenuation at 7.2 MHz and beyond to significantly attenuate harmonics of the 3.58 MHz subcarrier frequency. Filter section 42 also exhibits a relatively constant delay of about 400 nanoseconds to 1.5 MHz. The low pass amplitude vs. frequency response characteristic of filter section 42 is depicted by FIG. 2. Filter section 42 can exhibit the circuit configuration indicated by the circuit of FIG. 1a, which corresponds to an eighth order low pass filter including series inductors $L_1$–$L_4$ and shunt capacitors $C_1$–$C_3$.

The purpose of high order low pass filter section 42 is to provide low pass filtering over a relatively wide 0-1.5 MHz bandwidth, and to provide a prescribed amount of signal delay. In the latter regard it is noted that both filter networks 30 and 40 exhibit substantially equal amounts of signal delay so that the signal transit delay times of the I and Q signal processing paths are substantially equal. The frequency bandwidth of I filter network 40 is significantly greater (i.e., three times greater) than that of Q filter network 30. Thus I filter network 40 exhibits a higher order filter configuration relative to that of Q filter 30, in order to provide enough signal delay in the I signal path so that the signal processing delays of the I and Q signal paths are substantially equal. Low pass filter section 42 provides most of the signal delay exhibited by filter network 40.

Low pass filter 42 is doubly terminated by substantially equal terminating impedances. One of these terminating impedances corresponds to a resistor 41 (1 kilohm) connected to one end of filter section 42. The other of these terminating impedances corresponds to the sum of the value of a resistor 43 (910 ohms), the small DC resistance value of an inductor 54 associated with filter section 52, and the value of a resistor 58 (56 ohms). Thus filter section 42 is substantially equally terminated in 1 kilohm impedances.

The purpose of filter section 52 is to provide signal peaking. Peaking section 52 comprises an inductor 54 and a capacitor 55 arranged as a second order relatively high "Q" (figure of merit) series resonant circuit with a peaking frequency determined by the resonant frequency of inductor 54 and capacitor 55. Peaking section 52 exhibits a delay of about 100 nanoseconds, much less than the delay provided by low pass filter section 42. One end of peaking section 52 is terminated by means of relatively small value resistor 58 (56 ohms), while the other end of section 52 is terminated by a much larger value resistance including resistor 43. Resistor 58 damps the peaking response exhibited by section 52, thereby providing a means for controlling the amount of peaking exhibited by section 52.

Figure 3:
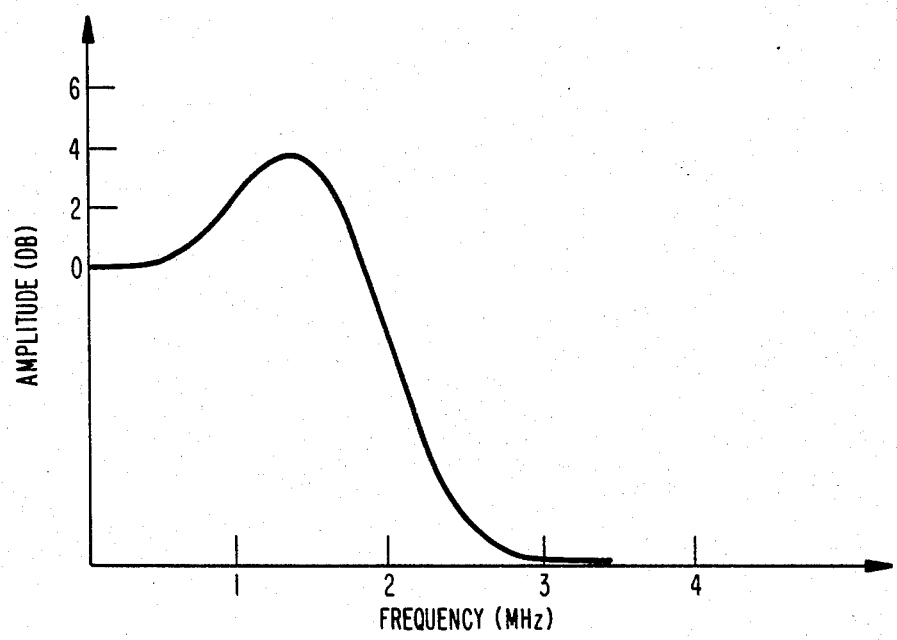

The peaked low pass amplitude-versus-frequency response (transfer function) provided by filter network 40 is illustrated by FIG. 3. The peaked portion of the response characteristic shown in FIG. 3 is determined by the response of peaking section 52. Amplitude peaking encompasses a frequency bandwidth commencing at approximately 0.5 MHz and continuing to approximately 1.75 MHz and, as will be discussed, is affected somewhat by filter section 42. The overall low pass frequency response is primarily determined by filter section 42, with some contribution from peaking section 52.

In the illustrated embodiment, cascaded low pass filter section 42 and peaking section 52 exhibit mutually grossly mismatched terminating resistances to substantially prevent interaction between these sections over the lower frequency range of the I signal passband, from DC to approximately 0.5 MHz, although some interaction occurs over the higher frequency (peaking frequency) range of the I signal passband. Thus over the lower frequency range of the I signal passband filter section 42 provides wideband low pass filtering substantially uninfluenced by peaking section 52. That is, neither section "sees" the other.

More specifically, the terminating resistance for that end of filter section 42 which is remote from terminal b is primarily determined by the value of resistor 43, which serves to passively interconnect sections 42 and 52. The value of this resistor is much larger than the sum of the DC resistance value of peaking section 52 and the value of resistor 58, whereby peaking section 52 and resistor 58 cause negligible loading of low pass filter section 52. On the other hand, the end node of peaking section 52 at the junction of inductor 54 and capacitor 55 is presented with a very high resistance of approximately 2 kilohms, comprising the values of resistors 43 and 41 and the DC resistance of filter section 42. Accordingly, this end of peaking section 52 is essentially unterminated relative to the end of section 52 at terminal "a", and is negligibly loaded by filter section 42 including resistors 41 and 43.

In this regard it is noted that resistor 41 is excited with an I signal voltage derived from the emitter of transistor 15, and intermediate filter terminal c is excited with substantially the same I signal voltage via the low impedance emitter output of a PNP voltage follower transistor 47. The circuit node at the junction of inductor 54 and capacitor 55 in peaking sectiion 52 exhibits a relatively low impedance as a function of the relatively low impedance of peaking network 52. Peaking network 52 is driven via this node by the I signal voltage from the low impedance emitter of transistor 47. This node also represents a low impedance driving point for the much higher impedance circuit comprising coupling resistor 43 and filter section 42. The operation of network 40, particularly with respect to the manner in which the filter comprising sections 42 and 52 is excited with signals at both terminals "b" and "c", will be discussed in greater detail subsequently.

The DC impedance mismatch ratio between sections 42 and 52 is approximately 35:1, as determined by the ratio of the values of the DC impedances between terminal B and peaking section 52 (approximately 2 kilohms), to the value of resistor 58. The inductors associated with sections 42 and 52 exhibit negligibly small DC resistance values, preferably on the order of 1 or 2 ohms. At 0.5 MHz, the lower limit of the I signal high frequency range (i.e., the lower limit of the peaking frequency range), the impedances of sections 42 and 52 are such that the impedance ratio of these sections is approximately 17:1. In the disclosed arrangement of network 40, an impedance mismatch ratio between cascaded sections 42 and 52 of 5:1 is marginally acceptable to prevent substantial interaction between the sections, an impedance mismatch ratio of 10:1 is good, and an impedance mismatch ratio of 100:1 is excellent.

Thus sections 42 and 52 do not exhibit significant interaction over the lower frequency range of the I signal passband, from DC to approximately 0.5 MHz. This assures a predictable response over this frequency range, which is important because much of the color information which is readily perceivable on a displayed color picture is associated with signal frequencies within this low frequency range. More specifically, over this frequency range it is desirable to maintain a predictably flat, substantially uniform signal delay and amplitude response to avoid distortion effects such as ripple, for example.

At 1.0 MHz, corresponding to the middle of the I signal peaking frequency range, and at 1.5 MHz, corresponding to the upper limit of the peaking frequency range, the impedances exhibited by sections 42 and 52 are such that the impedance ratios of these sections are approximately 4.0:1 and 3.0:1, respectively. Thus sections 42 and 52 exhibit some interaction at these frequencies and within the peaking frequency range. In particular, over the peaking frequency range from 0.5 MHz to 1.5 MHz the impedance of filter section 42 has a loading effect on peaking section 52. This loading effect serves to "damp" the amount of peaking over the peaking frequency range, thereby preventing an excessive amount of peaking from being imparted to the I signal.

In this embodiment, amplifier transistor 15 in I demodulator network 14 is intended to exhibit a substantially unity DC gain, and an AC gain in accordance with the transfer function of filter network 40 for developing a demodulated I signal voltage across output resistor 16 in accordance with the transfer function of filter network 40. The substantially unity DC gain requirement dictates that the DC impedance presented to the emitter of transistor 15 via terminal B exhibits substantially the same value (2 kilohms) as the DC collector impedance represented by collector resistor 16. This requirement is satisfied by filter network 40, which additionally provides a DC bias current path from the emitter of transistor 15 to ground via terminal B, resistor 41, filter section 42, resistor 43, inductor 52 and resistor 58. The DC gain and emitter biasing of transistor 15 as noted above would be disturbed if cascaded sections 42 and 52 were isolated by means of an emitter follower buffer transistor, for example, connected between sections 42 and 52. The disclosed arrangement advantageously avoids the need for such a buffer transistor to isolate sections 42 and 52, and desirably provides the DC bias path and required DC emitter impedance for amplifier transistor 15.

As will be described in greater detail subsequently, network 40 synthesizes, at interface terminal B, an impedance related to the composite transfer function of filter sections 42 and 52. Signal currents conducted by the emitter-collector path of amplifier transistor 15 in I demodulator network 14 accordingly exhibit the combined transfer functions of filter sections 42 and 52, and therefore a corresponding signal voltage developed across output load resistor 16 also exhibits the filter transfer function. Thus the demodulated I signal, as applied to the base input of transistor 15, is provided from the output of demodulator network 14 in accordance with the transfer function of the I filter.

The recovered I signal provided by demodulator 14 in accordance with the peaked transfer function shown by FIG. 3 suitably compensates for the amplitude loss associated with the absence of one of the sidebands in the high frequency portion of the transmitted I signal. Thus greater use is made of the available information content of the wideband I signal, particularly in the high frequency portion thereof containing information relating to orange and cyan color information. Wide bandwidth (0–1.5 MHz) processing of the I signal in accordance with the disclosed arrangement is particularly advantageous in high definition color television signal processing systems, such as color receivers employing comb filtering techniques for extracting the luminance and chrominance components from the composite color television signal prior to luminance and chrominance processing. With wide bandwidth I demodulation, greater use can be made of the available color information content of the television signal, resulting in improved color picture definition and enhanced subjective color sharpness.

The arrangement of filter network 40 is particularly advantageous since it represents a means by which a high order, two-port, three terminal filter can be connected to associated circuits by means of only a single interfacing terminal, e.g., terminal B. This result is desirable when there is only a single terminal (e.g., terminal B) of an integrated circuit (such as comprising circuit 14) available to provide a transfer function of a filter normally requiring both input and output terminals coupled in the signal path. Additional aspects of the operation of filter network 40 will now be described in detail.

Network 40 includes a substantially unity voltage gain PNP emitter follower transistor 47 with a high impedance base signal input electrode coupled to terminal B via a small resistor 48 (100 ohms), and a low impedance emitter output electrode coupled to filter terminal c. The arrangement of the filter including sections 42 and 52 with transistor 47 causes the collector current of amplifier transistor 15 to exhibit a transfer function H(s) corresponding to the transfer function H(s) of the filter. Accordingly, an output signal voltage developed across collector load resistor 16 exhibits the transfer function of the filter.

The demodulated I signal voltage developed at the low impedance emitter of transistor 15 appears at terminal B and at the base input of voltage follower transistor 47. Transistor 47 exhibits a substantially unity signal voltage gain (e.g., approximately 0.98), and applies the I signal voltage via the low impedance emitter of transistor 47 to intermediate terminal c of the filter. In essence, transistor 47 acts as a second source of signal voltage for application to the filter via filter terminal c, the first source of signal voltage corresponding to the emitter of amplifier transistor 15 which is coupled to filter terminal "b" via terminal B and resistor 41.

It is noted that with this arrangement, signal voltages of similar phase and substantially equal magnitude are respectively applied to intermediate filter terminal c, and to resistor 41 which is connected to filter terminal "b" (i.e., a substantially zero signal voltage differential exists between filter terminal c and interfacing terminal B). Also, resistor 58 connects filter terminal "a" to a point of fixed potential (ground). Thus filter terminals b and c are excited with input signal voltages whereas filter terminal "a" is not. As a result, the current conducted by resistor 58 varies in accordance with the input signal voltage applied to terminal B, but does not exhibit the overall peaked low pass transfer function of the filter. However, the current conducted by resistor 41 and terminal B exhibits the peaked low pass transfer function of the filter. This current corresponds to the collector-emitter current of amplifier transistor 15, and causes load resistor 16 to exhibit a signal voltage having the overall peaked low pass transfer function of the filter.

To better understand the operation of filter network 40, assume for the moment that the three terminal (a,b,c) filter including sections 42, 52 is connected in a conventional configuration. In such case intermediate terminal "c" would be connected to point of fixed reference potential (e.g., ground), and terminal "b" would be connected to ground via resistor 41. Input signals would be applied to terminal "a" via "input" resistor 58, and filtered signals would appear at terminal "b" across "output" resistor 41. In such a conventional filter configuration, terminal "a" alone would be modulated with input signals, while terminal c and the end of "output" resistor 41 which is remote from terminal b would both be at a fixed potential relative to input terminal a. The current conducted by "output" resistor 41 would exhibit the transfer function of the three terminal filter. This same result is achieved by the arrangement of network 40, wherein both filter terminals b and c are similarly excited with signals, but filter terminal a is coupled to fixed ground reference potential. Thus the disclosed arrangement of network 40, wherein two of the filter terminals are excited with signals relative to the third terminal which is coupled to a fixed potential, produces a result equivalent to that produced by a conventional three terminal filter configuration wherein only one of the filter terminals is excited with signal relative to the other two terminals which are coupled to fixed potentials.

Network 40 synthesizes, at terminal B, an impedance which is related to (i.e., the reciprocal of) the peaked low pass transfer function of the three-terminal filter. The signal current conducted by resistor 41, terminal B and the collector-emitter path of transistor 15 corresponds to the product of the I signal voltage at the emitter of transistor 15 and the peaked low pass transfer function of the filter. In this regard it is noted that the emitter signal voltage of amplifier transistor 15 substantially corresponds to the base signal voltage of transistor 15, but the emitter and collector signal currents of transistor 15 exhibit the peaked low pass filter transfer function.

What is claimed is:

1. In a video signal processing system including a signal path for conveying video signals, frequency selective apparatus coupled to said signal path for translating signals conveyed by said signal path, comprising:
   a first frequency selective section including parameters determinative of the frequency response of said first section;
   a second frequency selective section including parameters determinative of the frequency response of said second section;
   resistance means for passively connecting said first section to said second section, said resistance means being of a value to substantially preclude mutual interaction between the parameters of said first and second sections over a given range of signal frequencies within the passband of signals to be translated; and
   means for exciting said first and second sections with signals from said signal path to modify the amplitude-versus-frequency response of signals conveyed by said signal path, in accordance with the amplitude-versus-frequency responses of said first and second sections.

2. In a video signal processing system including a signal path for conveying video signals, frequency selective apparatus coupled to said signal path for translating signals conveyed by said signal path, comprising:
   a first frequency selective section;
   a second frequency selective section;
   resistance means for passively connecting said first section to said second section, said resistance means exhibiting a value substantially greater than the resistance value associated with said second section; and
   means for exciting said first and second sections with signals from said signal path to modify the amplitude-versus-frequency response of signals conveyed by said signal path, in accordance with the amplitude-versus-frequency responses of said first and second sections.

3. Apparatus according to claim 2, wherein
   said second section is directly excited with signals to be translated, as derived from said signal path, at a point intermediate to said first and second sections.

4. Apparatus according to claim 2, wherein
   a first resistor terminates one end of said second section; and
   said resistance means includes a second resistor for passively connecting said first section to said second section, said second resistor exhibiting a resistance value substantially greater than the combined resistance values of said first resistor and said second section.

5. Apparatus according to claim 4, wherein
a third resistor terminates one end of said first section remote from the connection of said second resistor to said first section;
said second and third resistors exhibit substantially equal values; and
said second resistor exhibits a value substantially greater than the value of said first resistor.

6. Apparatus according to claim 2, wherein
said first section provides signal filtering over a given frequency range and exhibits a given signal delay; and
said second section exhibits a peaked amplitude response within a given portion of said frequency range.

7. Apparatus according to claim 6, wherein
said first frequency selective section comprises a high order low pass filter; and
said second frequency selective section comprises a single-tuned resonant circuit.

8. Apparatus according to claim 2, wherein
said first and second sections comprise a direct current path from said signal path to a point of reference potential.

9. Apparatus according to claim 2, wherein
said frequency selective apparatus including said first and second sections comprises a high order filter of the type having three terminals and two signal ports, and exhibiting a combined transfer function between said two signal ports corresponding to the combined transfer functions of said first and second sections; and
said filter is coupled via a single interface terminal to said signal path to effect filtering of signals conveyed by said signal path in accordance with said transfer function.

10. Apparatus according to claim 9, further comprising:
means coupled to said filter for synthesizing, at said single interface terminal, an impedance related to the transfer function of said filter.

11. Apparatus according to claim 2, wherein
said frequency selective apparatus comprises a signal filter, including said first and second sections, of the type comprising a first terminal corresponding to a signal port, a second terminal corresponding to a signal port, and a third terminal intermediate to said first and second terminals; said filter exhibiting a transfer function between said first and second terminals;
first means for coupling signals from said signal path to said first filter terminal;
second means for coupling said second filter terminal to a reference potential; and
third means for coupling signals from said signal path to said intermediate third terminal.

12. Apparatus according to claim 11, wherein
said first and third coupling means include respective signal voltage sources for separately exciting said first and third filter terminals.

13. Apparatus according to claim 12, wherein
a resistance couples a signal voltage to said first filter terminal; and
signal voltages applied to said resistance and to said third filter terminal exhibit similar phase and substantially equal magnitude.

14. In a video signal processing system including a signal path for conveying video signals, frequency selective apparatus for translating signals conveyed by said signal path, comprising:
a first frequency selective section having first and second end portions;
a first resistor for terminating said first end portion of said first section;
a second frequency selective section having first and second end portions;
a second resistor for terminating said first end portion of said second section;
means, comprising a third resistor, for passively coupling together said second end portions of said first and second sections, said passive coupling means exhibiting a resistance value substantially greater than the combined resistance values of said second resistor and said second section; and
means for separately exciting said first and second sections directly with signals to be translated as derived from said signal path.

15. Apparatus according to claim 14, wherein
said frequency selective apparatus including said first and second sections comprises a filter of the type having three terminals and two signal ports, and exhibiting a combined transfer function between said two signal ports corresponding to the combined transfer functions of said first and second sections;
said first signal port corresponds to said first terminal and is coupled to said first terminating resistor;
said second signal port corresponds to said second terminal and is coupled to said second terminating resistor;
said third terminal is coupled intermediate to said first and second terminals and is coupled to said first and second sections;
said first terminal is excited with signals to be translated as derived from said signal path;
said second terminal is coupled to a reference potential via said second resistor; and
said intermediate third terminal is excited with signals to be translated as derived from said signal path.

16. Apparatus according to claim 14, wherein
said first and third resistors exhibit substantially equal values; and
said second and third resistors exhibit substantially different values.

17. In a system for processing a color television signal including a chrominance information component exhibiting a first amplitude level over a first frequency range and a second amplitude level lower than said first amplitude level over a second frequency range, frequency selective apparatus for processing said chrominance component, comprising:
a first frequency selective section for providing signal filtering over said first and second frequency ranges, and exhibiting a given signal delay; and
a second frequency selective section exhibiting a peaked amplitude response encompassing frequencies within said second frequency range;
resistance means for passively connecting said first section to said second section, said resistance means being of a value substantially greater than the resistance value associated with said second section; and
means for exciting said first and second sections with signals from said signal path to modify the amplitude-versus-frequency response of signals conveyed by said signal path, in accordance with the amplitude-versus-frequency response of said first and second sections.

18. Apparatus according to claim 17, wherein said processing system comprises a color television receiver including:
   means for receiving a composite color television signal including a chrominance subcarrier signal containing chrominance modulation information in double sideband form over said first frequency range, and chrominance modulation information in single sideband form over a higher frequency range corresponding to said second frequency range;
   means for synchronously detecting said modulated chrominance component to produce said chrominance information component having said first and second amplitude levels over said first and second frequency ranges; and wherein
   said frequency selective apparatus filters output signals from said synchronous detecting means.

19. Apparatus according to claim 17, wherein
   said first frequency selective section comprises a high order low pass filter;
   said second frequency selective section comprises a resonant circuit;
   a first resistor terminates one end of said first section;
   a second resistor terminates one end of said second section; and
   said resistance means corresponds to a third resistor coupled to the other ends of said first and second sections for passively interconnecting said first and second sections in cascade, said third resistor exhibiting a resistance value substantially greater than the combined resistance values of said second section and said second resistor.

20. Apparatus according to claim 19, wherein
   said first and third resistors exhibit substantially equal values; and
   said second and third resistors exhibit substantially different values.

21. In a signal processing system including a signal path for conveying signals to be translated, said signal path including an amplifier device for receiving input signals to be translated; frequency selective apparatus comprising:
   a first frequency selective section;
   a second frequency selective section;
   resistance means for passively connecting said first section to said second section, said resistance means exhibiting a resistance value substantially greater than the resistance value associated with said second section;
   means for coupling said frequency selective apparatus including said first and second sections in series with a main current conduction path of said amplifier device;
   means for exciting said first and second sections with signals from said signal path; and wherein
   said frequency selective apparatus provides a direct current path for currents conducted by said main conduction path of said amplifier device.

22. Apparatus according to claim 21, and further comprising:
   a load resistance included in an output circuit of said amplifier device;
   plural resistances, including said resistance means, for respectively terminating said first and second sections; and wherein
   the DC gain of said amplifier device is primarily determined by the ratio of the value of said load resistance to the combined values of said plural terminating resistances.

23. Apparatus according to claim 22, wherein
   said amplifier device comprises a transistor with a base input electrode, a collector electrode coupled to said load resistance, and an emitter electrode coupled to said frequency selective apparatus.

* * * * *